3,443,060
THERMOSTATICALLY CONTROLLED ELECTRIC BLOOD HEATING APPARATUS
Edward M. Smith, Mansfield, Ohio, assignor, by mesne assignments, to The Gorman-Rupp Company, Mansfield, Ohio, a corporation of Ohio
Filed Feb. 9, 1967, Ser. No. 614,993
Int. Cl. F24h 1/20
U.S. Cl. 219—302          9 Claims

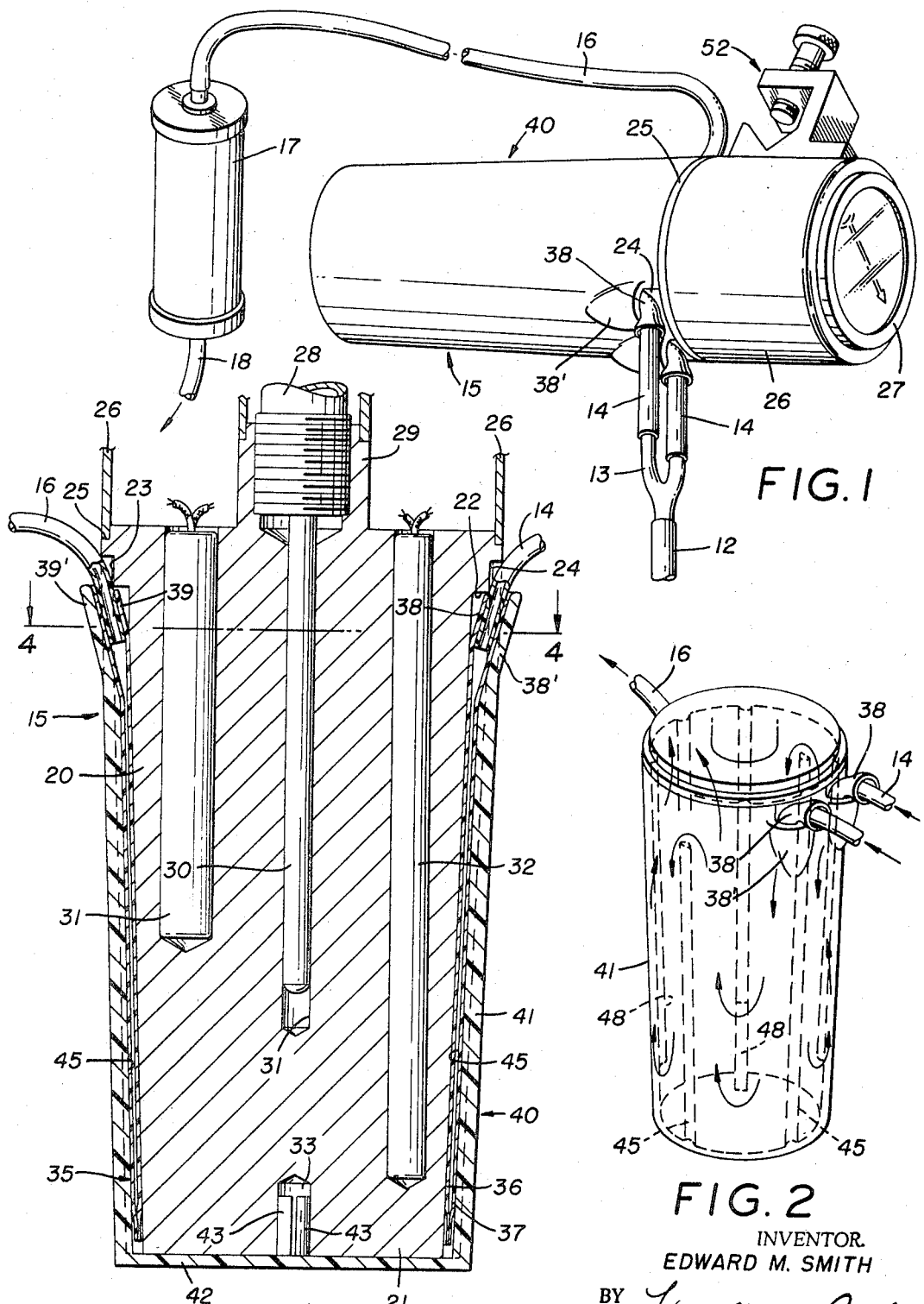

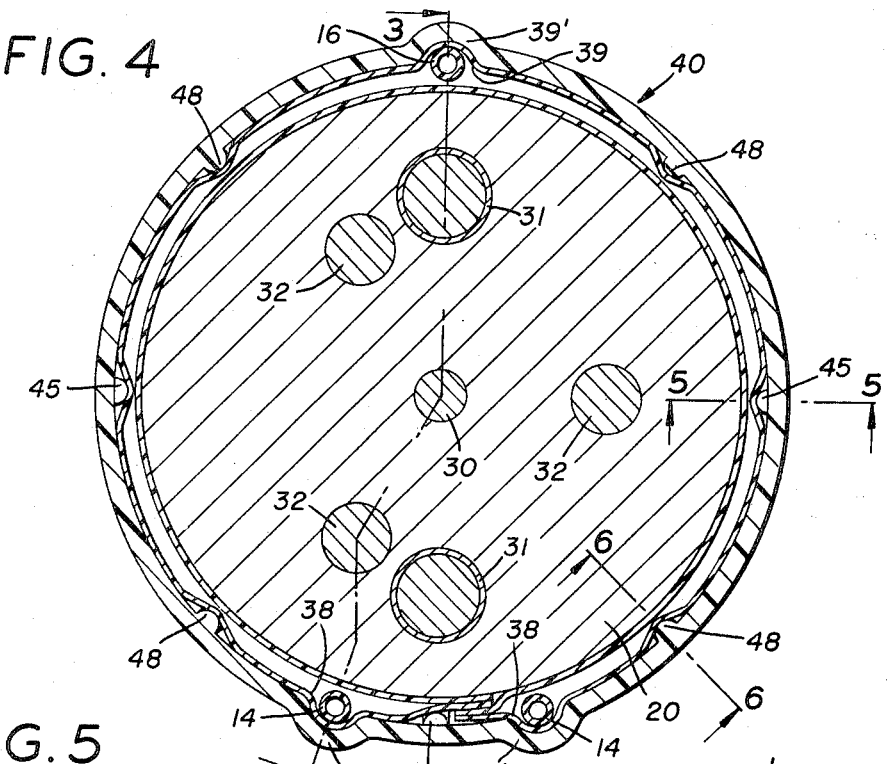
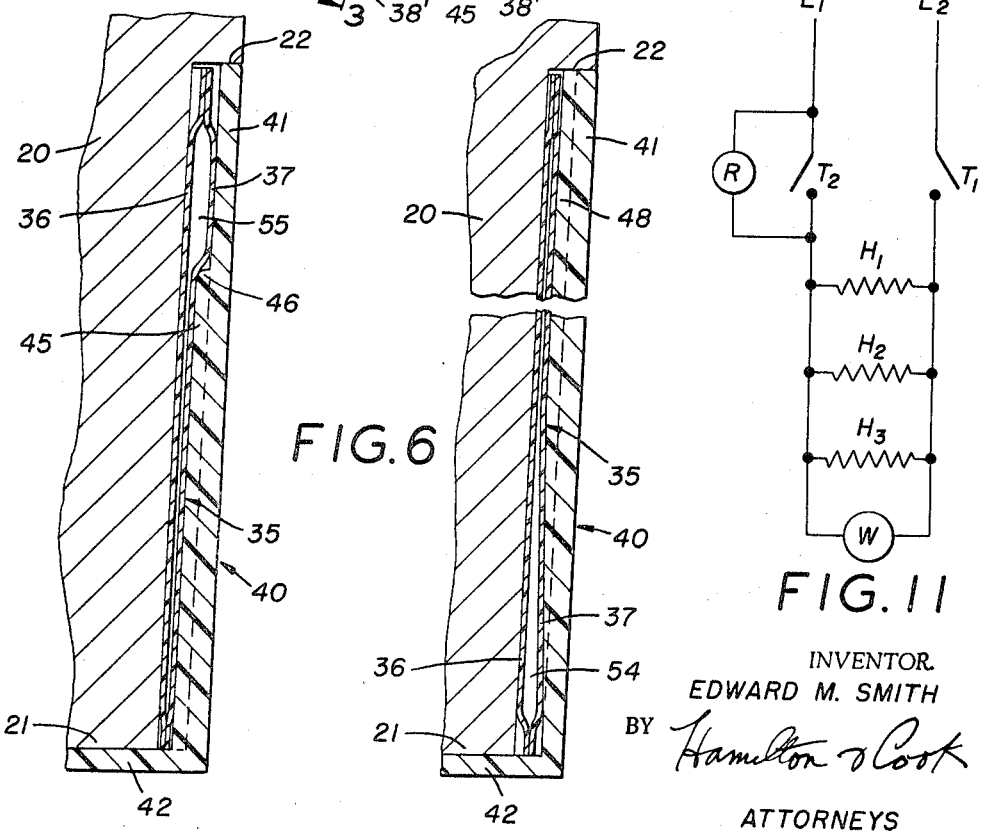

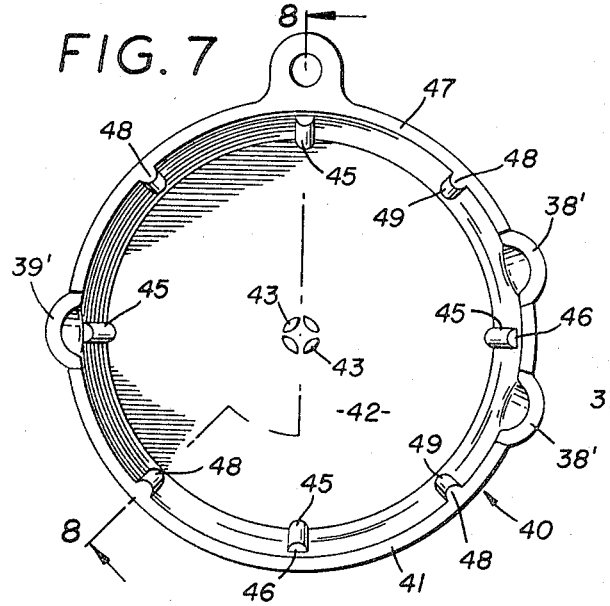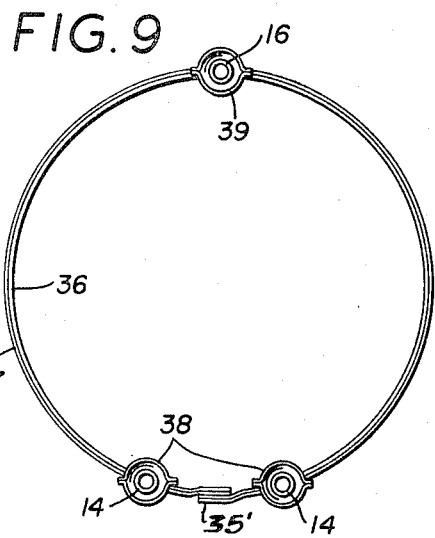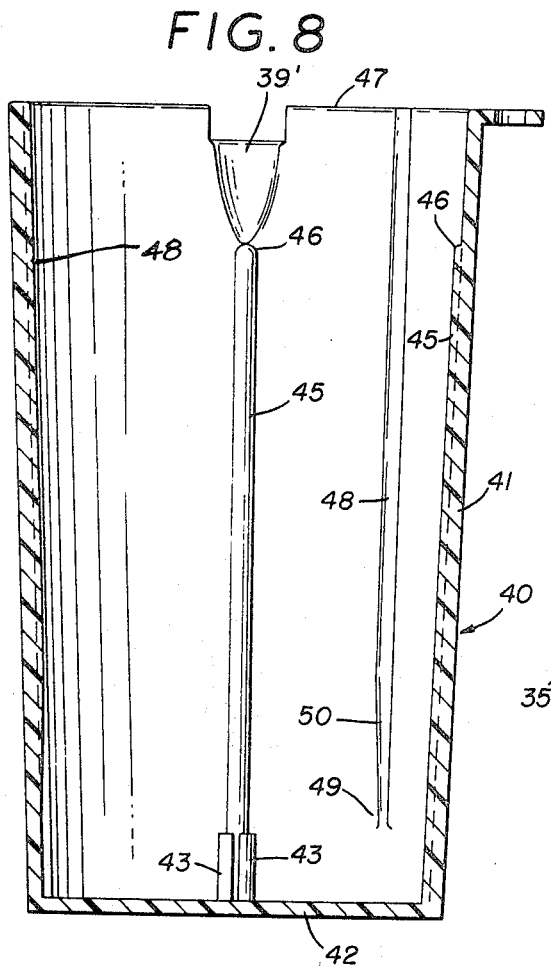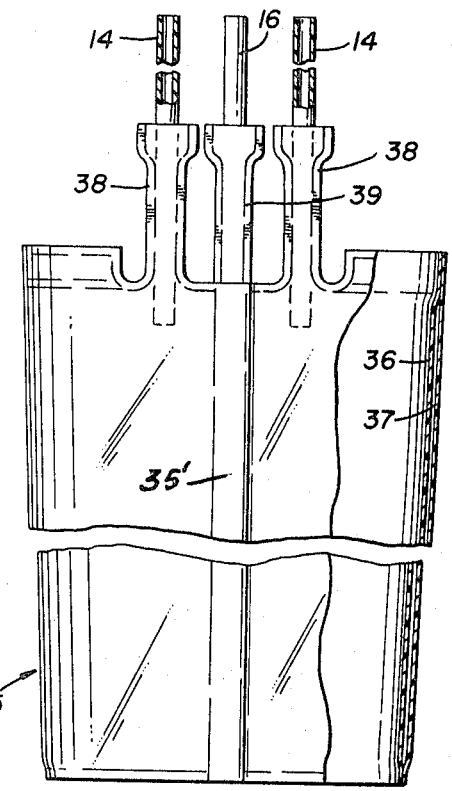
INVENTOR.
EDWARD M. SMITH
BY Hamilton & Cook
ATTORNEYS

United States Patent Office 3,443,060
Patented May 6, 1969

ABSTRACT OF THE DISCLOSURE

The invention relates generally to devices for heating human blood and maintaining it at a substantially optimum temperatures for transfusion.

An apparatus for maintaining the flow of blood at optimum temperature for transfusions includes a double-walled plastic bag telescoped between inner and outer mandrels, one of which has ribs restricting the bag to form a labyrinth of blood-flow passageways within the bag. The inner mandrel is electrically heated and the temperaure is accurately thermostatically controlled to maintain the blood at the optimum temperature. The apparatus is provided with dual thermostatic temperature control in which a second thermostat takes over control of the electric heater if the first thermostat fails. Indicator means are provided to signal failure of the first thermostat. A temperature guage is provided so that the temperature of the inner mandrel may be monitored.

Background of the invention

Prior constructions of which I am aware for controlling the temperature of human blood for transfusions have been crude and inaccurate, resulting in too much or too little heat under varying conditions. One prior method is to heat the flask containing the supply of blood, but as the supply decreases it is very difficult to maintain the blood reaching the patient at optimum temperature.

It is very important that the blood being injected into the veins of a patient be maintained at a temperature very close to the optimum body temperature of 98.6° F. If the blood temperature drops below the optimum temperature there is danger of an injurious chill or shock to the system. If the blood temperature rises too much the blood may coagulate or deteriorate. At a temperature of 107° F., the structure of the blood begins to break down.

Certain prior constructions have caused difficulties due to the fact that the rate of flow of the blood to the patient is often purposely varied, and the heat imparted to the blood is not varied accordingly with sufficient accuracy or without a substantial time lag, so that the blood reaching the patient is not at the proper temperature.

It is an object of the present invention to provide an improved blood heating device which will deliver blood to a patient substantially at optimum temperature regardless of variations in the volume of the supply and the rate of flow to the patient.

Another object is to provide an improved heat transfer between the heating means and the blood accurately to maintain its temperature within narrow limits while preventing damage to or deterioration of the blood structure.

A further object is to provide an improved device which efficiently heats the blood while substantially avoiding trapping of air in the blood.

A further object is to provide an extended labyrinth passageway throughout which the optimum temperature of the blood is accurately maintained, so that the temperature is not materially affected by the rate of flow.

Still another object is to provide an improved dual thermostatic temperature control in which a second thermostat takes over control if the first thermostat fails.

These and other objects are accomplished by the improvement comprising the present invention, a preferred embodiment of which is shown in the accompanying drawings and described in detail herein. Variations and modifications in details of construction are within the scope of the appended claims.

Summary of the invention

In summary, the invention comprises an improved blood heating device in which a relatively large volume of blood is maintained substantially at body temperature by passing the blood back and forth through a labyrinth of passages in a double-walled plastic bag telescoped between inner and outer mandrels, the passageways being formed by ribs on one mandrel partly restricting the bag a predetermined amount to define the passageways without pinching the blood corpuscles. The inner mandrel has heating elements therein, the temperature of which is controlled by two thermostats in the mandrel set at slightly different temperature levels in a narrow range including normal body temperature, the thermostats being series connected in such manner that the lower temperature thermostat normally controls, but if it malfunctions the other thermostat takes over control.

Brief description of drawings

FIG. 1 is a schematic perspective view of a preferred embodiment of the assembled device in operating position.

FIG. 2 is a similar view showing the path of circulation of the blood through the passageways formed in the plastic bag.

FIG. 3 is an enlarged partial sectional view as on line 3—3 of FIG. 4.

FIG. 4 is a cross section on line 4—4 of FIG. 3.

FIG. 5 is a partial section on line 5—5 of FIG. 4.

FIG. 6 is a partial section on line 6—6 of FIG. 4.

FIG. 7 is a plan elevation looking at the open end of the outer mandrel in detached position.

FIG. 8 is a section on line 8—8 of FIG. 7.

FIG. 9 is a plan elevation looking at the open end of the plastic bag in detached position.

FIG. 10 is a side elevation thereof, partly in section.

FIG. 11 is a wiring diagram of the circuit for the heating elements and thermostats.

Description of the preferred embodiment

Referring to FIG. 1 the inlet tube 12 is connected to a supply flask (not shown) containing human blood for transfusions. A Y connector 13 divides the blood and supplies it to two inlet tubes 14 entering at the bottom of the blood heating device indicated as a whole at 15. After passing through the heating device, the blood is discharged through tube 16 connected to the top of the device and then passes through an air bubble trap 17 of well-known construction, and thence through tube 18 to the patient.

Referring to FIGS. 3–6, the inner mandrel 20 is preferably of solid aluminum, and of circular cross section with a slight conical taper from its smaller end 21 to an annular shoulder 22 on its larger end. A recess 23 is provided adjacent shoulder 22 for facilitating connection with discharge tube 16, and two similar recesses 24 are provided opposite recess 23 for facilitating connections with inlet tubes 14.

An outer annular shoulder 25 is preferably provided on the larger end of the inner mandrel or core 20, and supporting housing 26 fits onto this shoulder and mounts a temperature gauge 27 at the outer end as shown in FIG.

1. The gauge has a tube 28 depending therefrom screwed into the tubular projection 29 on the large end of mandrel 20, and a temperature-sensing element 30 extends axially through the tube into an axial bore 31 in the mandrel.

Two elongated bores parallel to and on opposite sides of element 30 are provided for receiving thermostat rods 31 and three spaced bores of smaller diameter are provided for receiving cartridge type heating elements 32 of well-known construction. At the small end 21 of mandrel 20 a short axial bore 33 is provided for holding the outer mandrel when it is telescoped over the inner mandrel 20.

As shown in FIGS. 9 and 10, the double-walled plastic bag which fits telescopically over the inner mandrel 20 is indicated as a whole at 35, and comprises inner and outer substantially cylindrical sheets 36 and 37, or slightly tapered cones, having their ends heat sealed together and sealed axially down the side where the ends join, as at 35'. Thus a substantially annular passageway is formed between the two sheets or walls 36 and 37. Preferably the plastic of which the bag is formed is medically pure vinyl.

At the large end the bag has inlet and outlet tubular projections substantially diametrically opposite each other. Preferably two inlet tubes 38 are formed on one side of the bag and located one on either side of the axial seal 35' and a single outlet tube 39 on the opposite side. These tubes are formed integrally with the bag and provide communication to and from the space between walls 36 and 37. Their internal diameters are such as to receive the ends of standard tubing 14 and 16 which are sealed therein.

As shown in FIGS. 7 and 8, the outer mandrel or sleeve is indicated as a whole at 40, and has an outer wall 41 with a slight conical taper corresponding to that of the inner mandrel, the small end being closed by an end wall 42. Preferably, the outer mandrel is made of substantially rigid transparent plastic, such as polycarbonate. At the center of end wall 42 are circularly arranged projecting fingers 43 for frictionally fitting into the axial bore 33 to hold the outer mandrel when it is telescoped over the inner mandrel, as indicated in FIG. 3. In this position the larger end of the outer mandrel abuts the annular shoulder 22 on the inner mandrel (FIGS. 5 and 6) and the annular space between the inner mandrel and the wall 41 of the outer mandrel is such as to receive the bag 35.

The outer mandrel 40 has outwardly flared notched protuberances 38' and 39' at its larger end forming tubular recesses through which the tubular projections 38 and 39, respectively, emerge. Circumferentially spaced longitudinal ribs are formed on the inner surface of mandrel 40 to prevent the separation of walls 36 and 37 of the bag, to form passageways therein. Four ribs 45 spaced 90° apart extend from the end wall 42 to ends 46 spaced from the open end 47 of mandrel 41, one of said ribs being aligned with protuberance 39' and terminating at the inner end thereof. The opposite rib 45 is located between the protuberances 38'. The other four ribs 48 are positioned midway between ribs 45 and extend from the end 47 of mandrel 41 to ends 49 spaced from end wall 42. Preferably, the terminal portions 50 of ribs 48 are tapered as shown in FIG. 8.

The thickness of the ribs is designed to limit the separation of outer wall 37 of the bag from the inner wall 36 to such extent as to leave a clearance of about .005 inch between the walls 36 and 37. This effectively forms passageways between the walls for the circulation of blood in predetermined paths and at the same time prevents rupture or damage to the blood corpuscles which might occur if the ribs pinched the walls tightly together. Moreover, the slight clearance under the ribs increases the heat transfer area and helps to prevent trapping of air bubbles. Obviously, the ribs could be formed on the inner mandrel instead of the outer mandrel.

In operation the blood heating device is positioned in a horizontal position as in FIG. 1, the inner mandrel being provided with a support clamp 52 for connection to a suitable support. The two inlets are positioned on the underside and the single outlet on top. The thermostats 30 are set about 2° F. apart, say at 100° F. and 102° F., and are connected in series with the electrical heaters 31. The wiring diagram for the circuit is shown in FIG. 6, in which the thermostats are indicated at $T_1$ and $T_2$ and the heaters at $H_1$, $H_2$, and $H_3$.

The temperature of the inner mandrel is normally controlled by thermostat $T_1$ to be at 100° F., which is slightly above normal body temperature of 98.6° F. to compensate for loss due to heat transfer and still be well below the temperature of about 107° F. when body blood deteriorates or breaks down. Thermostat $T_2$ is set at 102° F. and connected to take over if for any reason $T_1$ fails to function. In the wiring diagram $T_1$ and $T_2$ are represented as switches and $T_1$ is set to open at 100° F. and interrupt the circuit until the temperature starts to drop, at which time it will again close. W represents a white light in the circuit which will flash on and off during normal operation. Should the thermostat $T_1$ fail to function, thermostat $T_2$ will open at the slightly higher temperature of 102° F. and control the temperature of the inner mandrel. In such case both the white light W and a red warning light R will flash alternately, indicating the need for repair to $T_1$.

As the blood flows into the heating device through inlets 14, it flows inwardly through the passageways formed on opposite sides of the rib 45 located between the inlets. When it reaches the terminal portions 50 of adjacent ribs 48, it flows laterally through the non-pinched portions 54 (FIG. 6) into the adjacent passageways formed between ribs 48 and 45, and then back toward the larger end. When the blood reaches the ends 46 of the adjacent ribs 45 it flows laterally through the non-pinched portions 55 (FIG. 5) into the next adjacent longitudinal passageways, and finally reaches protuberance 39' where it discharges out of tube 16.

By having the two inlets on the bottom and the single outlet on top the blood flows in two directions through the labyrinth of passageways to the single outlet, thus minimizing the amount of air trappage and providing for maximum heat exchange. Further, the blood is constantly maintained at optimum temperature regardless of variations in the volume of blood supply or in the rate of flow to the patient.

I claim:

1. Apparatus for maintaining a flow of blood at optimum temperature for transfusions comprising an inner mandrel having high thermal conductivity, a plastic bag having inner and outer walls forming an annular passageway therebetween and telescoped over said mandrel, and an outer mandrel telescoped over said bag, ribs formed on one of said mandrels restricting said bag to form a labyrinth of passageways through said bag, inlet and outlet connections to said bag, and means for maintaining said inner mandrel at constant optimum temperature.

2. Apparatus as in claim in which said ribs restrict said bag to an extent leaving sufficient clearance between the bag walls to prevent damage to the blood flowing therethrough.

3. Apparatus as in claim 1 in which said ribs restrict said bag to an extent leaving a clearance of approximately .005 inch between the walls of the bag.

4. Apparatus as in claim 1 in which the bag is positioned in substantially horizontal position with two inlet connections on the bottom and one outlet connection on top.

5. Apparatus as in claim 1 in which the means for maintaining the inner mandrel at optimum temperature comprises two thermostats connected in series set at different temperatures slightly above optimum temperature so that if one fails the other takes over.

6. Apparatus as in claim 1 in which the bag is positioned in substantially horizontal position and has a longitudinal seal between two inlet connections on the bottom from which the blood flows in two labyrinth paths around said bag to a single outlet at the top.

7. Apparatus as in claim 6 in which the ribs restrict the bag to an extent leaving sufficient clearance to prevent damage to blood flowing therethrough.

8. Apparatus as in claim 6 in which the ribs restrict the bag to an extent leaving a clearance of approximately .005 inch between the walls of the bag.

9. Apparatus as in claim 6 in which the means for maintaining the inner mandrel at optimum temperature comprises two thermostats connected in series and set about two degrees Fahrenheit apart slightly above optimum temperature so that if one fails the other takes over.

References Cited

UNITED STATES PATENTS

| 1,514,813 | 11/1924 | Adams | 219—305 |
| 2,576,558 | 11/1951 | Bede | 219—325 X |
| 3,140,716 | 7/1964 | Harrison et al. | 128—214 X |
| 3,171,475 | 3/1965 | Waldman | 165—46 X |
| 3,293,868 | 12/1966 | Gonzalez | 128—399 X |
| 3,370,153 | 2/1968 | DuFresne et al. | 219—302 |

ANTHONY BARTIS, *Primary Examiner.*

U.S. Cl. X.R.

128—214; 165—46; 219—305, 330